United States Patent
Kirschner et al.

(10) Patent No.: US 8,327,754 B2
(45) Date of Patent: Dec. 11, 2012

(54) COFFEE AND TEA POD

(75) Inventors: Jonathan Kirschner, Powder Springs, GA (US); Charles Bradley Green, Dacula, GA (US); Louis Joseph Heinsz, Fayetteville, GA (US)

(73) Assignee: The Coca-Cola Company, Atlanta, GA (US)

( * ) Notice: Subject to any disclaimer, the term of this patent is extended or adjusted under 35 U.S.C. 154(b) by 2262 days.

(21) Appl. No.: 10/908,350

(22) Filed: May 9, 2005

(65) Prior Publication Data
US 2005/0183581 A1    Aug. 25, 2005

Related U.S. Application Data

(63) Continuation-in-part of application No. 10/604,445, filed on Jul. 22, 2003, now Pat. No. 6,948,420.

(51) Int. Cl.
*B65B 29/02*    (2006.01)

(52) U.S. Cl. ............... 99/295; 99/323; 426/77; 426/115

(58) Field of Classification Search ............. 99/295, 99/323; 426/433, 77, 115
See application file for complete search history.

(56) References Cited

U.S. PATENT DOCUMENTS

| | | |
|---|---|---|
| 1,951,357 A | 3/1934 | Hall |
| 2,743,664 A | 5/1956 | Dale |
| 2,778,739 A | 1/1957 | Rodth |
| 2,968,560 A | 1/1961 | Goros ........................... 99/77.1 |
| 3,151,418 A | 10/1964 | Powell et al. |
| 3,275,448 A | 9/1966 | Sommer |
| 3,428,460 A | 2/1969 | Ely |
| 3,589,272 A | 1/1970 | Bouladon ....................... 99/295 |
| 3,713,842 A | 1/1973 | Lubsen et al. |
| 3,812,273 A | 5/1974 | Schmidt ........................ 426/433 |
| 3,823,656 A | 7/1974 | Vekekn ........................... 99/295 |
| 3,888,999 A | 6/1975 | Jones et al. |
| 3,952,641 A | 4/1976 | Vitous ............................. 99/295 |
| 4,081,560 A | 3/1978 | Ishigaki |
| 4,107,339 A | 8/1978 | Shrimpton |
| 4,158,330 A | 6/1979 | Vitous ............................. 99/295 |
| 4,254,694 A | 3/1981 | Illy ................................. 99/295 |
| 4,389,925 A * | 6/1983 | Piana ......................... 99/289 R |
| 4,429,623 A | 2/1984 | Illy ................................. 99/295 |
| 4,471,689 A * | 9/1984 | Piana ............................. 99/295 |
| 4,581,239 A | 4/1986 | Woolman et al. ............. 426/433 |
| 4,605,175 A | 8/1986 | Weber |
| 4,644,855 A | 2/1987 | Woolman et al. ............... 99/280 |
| 4,775,048 A | 10/1988 | Baecchi et al. ................ 206/0.5 |

(Continued)

FOREIGN PATENT DOCUMENTS

BE    701.863    1/1968

(Continued)

OTHER PUBLICATIONS

Title: The Complexity of Coffee; by Emeto Illy; Scientific American; Jun. 2002; pp. 86-91.

(Continued)

*Primary Examiner* — Reginald L Alexander
(74) *Attorney, Agent, or Firm* — Sutherland Asbill & Brennan LLP (57) ABSTRACT

A pod for holding an amount of mixable material. The pod may include a circular sidewall and a base. The base may include a number of apertures. A substantially stiff filter paper may be positioned about the base.

4 Claims, 8 Drawing Sheets

U.S. PATENT DOCUMENTS

| | | | |
|---|---|---|---|
| 4,786,001 A | 11/1988 | Ephraim et al. | 241/101 |
| 4,798,732 A | 1/1989 | Osawa | |
| 4,829,889 A | 5/1989 | Takeuchi et al. | 99/289 P |
| 4,846,052 A | 7/1989 | Favre et al. | 99/295 |
| 4,860,645 A | 8/1989 | van der Lijn et al. | 99/295 |
| 4,886,674 A | 12/1989 | Seward et al. | 426/79 |
| 4,891,232 A | 1/1990 | Dahl | |
| 4,941,399 A | 7/1990 | Zucchetti | 99/289 |
| 4,946,701 A | 8/1990 | Tsai et al. | |
| 4,967,649 A | 11/1990 | Ephraim et al. | 99/286 |
| 4,980,182 A | 12/1990 | Kwon et al. | |
| 4,995,310 A | 2/1991 | van der Lijn et al. | 99/295 |
| 4,995,978 A | 2/1991 | Van de Gang | 210/474 |
| 4,996,066 A * | 2/1991 | Love et al. | 426/77 |
| 5,012,629 A | 5/1991 | Rehman et al. | |
| 5,043,172 A | 8/1991 | Loizzi | |
| 5,058,814 A | 10/1991 | Ephraim et al. | 241/152 |
| 5,082,676 A | 1/1992 | Love et al. | |
| 5,134,924 A | 8/1992 | Vicker | 99/280 |
| 5,135,764 A | 8/1992 | Clausi et al. | |
| 5,190,652 A | 3/1993 | van Thoor et al. | 210/474 |
| 5,197,374 A | 3/1993 | Fond | 99/295 |
| 5,207,148 A | 5/1993 | Anderson et al. | |
| 5,227,188 A | 7/1993 | Leppla et al. | 426/595 |
| 5,325,765 A | 7/1994 | Sylvan et al. | 99/295 |
| 5,343,799 A | 9/1994 | Fond | 99/295 |
| 5,347,916 A | 9/1994 | Fond et al. | 99/295 |
| 5,398,595 A | 3/1995 | Fond et al. | 99/295 |
| 5,398,596 A | 3/1995 | Fond | 99/295 |
| 5,402,707 A | 4/1995 | Fond et al. | 99/295 |
| 5,403,605 A * | 4/1995 | Smith et al. | 426/433 |
| 5,433,962 A | 7/1995 | Stipp | |
| 5,472,719 A | 12/1995 | Favre | 426/77 |
| 5,505,120 A | 4/1996 | Albertson | 99/280 |
| 5,554,400 A | 9/1996 | Stipp | |
| 5,567,461 A | 10/1996 | Lehrer | |
| 5,634,394 A * | 6/1997 | Cortese | 99/295 |
| 5,637,335 A | 6/1997 | Fond et al. | 426/84 |
| 5,638,741 A | 6/1997 | Cisaria | 99/295 |
| 5,721,005 A | 2/1998 | Gutwein | |
| 5,733,591 A | 3/1998 | Goerndt | |
| 5,741,538 A | 4/1998 | Stipp et al. | |
| 5,759,604 A * | 6/1998 | Bottlinger et al. | 426/433 |
| 5,783,246 A | 7/1998 | Wong et al. | 426/594 |
| 5,824,218 A | 10/1998 | Gasser et al. | 210/337 |
| 5,840,189 A | 11/1998 | Sylvan et al. | 210/474 |
| 5,855,161 A | 1/1999 | Cortese | 99/289 P |
| 5,895,672 A | 4/1999 | Cooper | |
| 6,021,705 A | 2/2000 | Dijs | |
| 6,079,315 A | 6/2000 | Beaulieu et al. | 99/289 R |
| 6,082,247 A | 7/2000 | Beaulieu | 99/302 R |
| 6,095,032 A | 8/2000 | Barnett et al. | 99/286 |
| 6,103,116 A | 8/2000 | Koslow et al. | 210/282 |
| 6,142,063 A | 11/2000 | Beaulieu et al. | 99/283 |
| 6,182,554 B1 | 2/2001 | Beaulieu et al. | 99/289 R |
| 6,186,051 B1 | 2/2001 | Aarts | 99/295 |
| 6,399,126 B1 | 6/2002 | Weldon | |
| 6,440,256 B1 | 8/2002 | Gordon et al. | 156/293 |
| 6,517,880 B2 | 2/2003 | Walters, Jr. et al. | 426/433 |
| 6,607,762 B2 | 8/2003 | Lararis et al. | |
| 6,645,537 B2 | 11/2003 | Sweeney et al. | |
| 6,740,345 B2 | 5/2004 | Cai | |
| 6,758,130 B2 | 7/2004 | Sargent et al. | |
| 6,759,072 B1 | 7/2004 | Gutwein et al. | |
| 6,786,134 B2 | 9/2004 | Green | 99/289 |
| 6,832,542 B2 * | 12/2004 | Hu et al. | 99/302 R |
| 6,869,627 B2 | 3/2005 | Perkovic et al. | |
| 6,915,733 B1 | 7/2005 | Langbauer | |
| 6,948,420 B2 | 9/2005 | Kirschner et al. | |
| 7,032,504 B2 | 4/2006 | Lee | |
| 7,210,401 B1 | 5/2007 | Rolfes et al. | |
| 7,340,990 B2 * | 3/2008 | Halliday et al. | 99/295 |
| 2001/0052294 A1 | 12/2001 | Schmed | 99/295 |
| 2002/0059870 A1 | 5/2002 | Walters Jr. et al. | 99/298 |
| 2003/0039731 A1 * | 2/2003 | Dalton et al. | 426/433 |
| 2003/0145736 A1 | 8/2003 | Green | 99/280 |
| 2005/0183578 A1 | 8/2005 | Mandralis et al. | |
| 2005/0183581 A1 | 8/2005 | Kirschner et al. | |
| 2005/0241489 A1 | 11/2005 | Kirschner et al. | |
| 2006/0110507 A1 | 5/2006 | Yoakim | |
| 2006/0124659 A1 | 6/2006 | Mosconi et al. | |
| 2006/0196363 A1 | 9/2006 | Rahn | |
| 2006/0196364 A1 | 9/2006 | Kirschner et al. | |

FOREIGN PATENT DOCUMENTS

| | | |
|---|---|---|
| EP | 2 617 389 A1 | 6/1987 |
| EP | 0272922 A2 | 6/1988 |
| EP | 0 326 099 A1 | 1/1989 |
| EP | 0361569 | 4/1990 |
| EP | 0398524 A2 | 11/1990 |
| EP | 0398530 A2 | 11/1990 |
| EP | 0 780 307 A1 | 10/1996 |
| EP | 0 780 310 A1 | 10/1996 |
| EP | 0 780 370 A3 | 10/1996 |
| EP | 0760222 B1 | 1/2000 |
| EP | 1 042 978 A1 | 4/2000 |
| EP | 0844195 B1 | 10/2001 |
| EP | 1054610 B1 | 3/2005 |
| EP | 1566127 A2 | 8/2005 |
| EP | 1566127 A3 | 8/2005 |
| EP | 1579791 A1 | 9/2005 |
| EP | 1579792 A1 | 9/2005 |
| EP | 1579793 A1 | 9/2005 |
| EP | 1580144 A1 | 9/2005 |
| EP | 1595817 A1 | 11/2005 |
| EP | 1629752 A2 | 3/2006 |
| EP | 1676786 A2 | 7/2006 |
| EP | 0844195 A1 | 10/2006 |
| EP | 1344722 B1 | 11/2006 |
| EP | 1654966 B1 | 12/2006 |
| EP | 1608569 B1 | 1/2007 |
| EP | 1367924 B1 | 7/2007 |
| EP | 18008382 A1 | 7/2007 |
| EP | 1580143 B1 | 11/2007 |
| FR | 757358 | 12/1933 |
| FR | 2127329 | 10/1972 |
| FR | 2213757 | 8/1974 |
| JP | 02-289207 | 11/1990 |
| JP | 03-010902 Y | 3/1991 |
| JP | 05-030674 Y | 8/1993 |
| JP | 06-315437 | 11/1994 |
| JP | 3244777 B | 1/2002 |
| JP | 2005-199071 A | 7/2005 |
| JP | 2006-513790 A | 4/2006 |
| JP | 3827079 | 9/2006 |
| JP | 2007-068498 A | 3/2007 |
| WO | WO 93/17932 | 2/1992 |
| WO | 95-07648 | 3/1995 |
| WO | WO 98/23196 | 6/1998 |
| WO | 99-58035 | 11/1999 |
| WO | WO 01/60220 A1 | 2/2001 |
| WO | WO 01/60712 A1 | 2/2001 |
| WO | 02-074143 | 9/2002 |
| WO | 03-065859 | 8/2003 |
| WO | 2004-083071 A1 | 9/2004 |
| WO | 2004-087529 A1 | 10/2004 |
| WO | 2005016094 A1 | 2/2005 |
| WO | 2006-014319 A2 | 2/2006 |
| WO | 2006-014936 A2 | 2/2006 |
| WO | 2006-016813 A2 | 2/2006 |
| WO | 2006-016814 A2 | 2/2006 |
| WO | 2006-021405 A2 | 3/2006 |
| WO | 2006-029109 | 3/2006 |
| WO | 2006-043096 A1 | 4/2006 |
| WO | 2006-043106 A2 | 4/2006 |
| WO | 2006-043108 A1 | 4/2006 |
| WO | 2006-057022 A1 | 6/2006 |
| WO | 2006-061494 A1 | 6/2006 |
| WO | 2006-069801 A1 | 7/2006 |
| WO | 2007-001579 | 1/2007 |

OTHER PUBLICATIONS

Brasilia S.p.A., PDM100 Spare Parts Catalog, Jan. 25, 2007, 35 pgs., Rev. No. 12, Retorbido, Italy.

* cited by examiner

COFFEE AND TEA POD

RELATED APPLICATIONS

The present application is a continuation in part of U.S. patent application Ser. No. 10/604,445, filed on Jul. 22, 2003, entitled "Coffee and Tea Pod", now allowed.

TECHNICAL FIELD

The present invention relates generally to a container for brewing material and more particularly relates to a pod for use in the automatic brewing of coffee, tea, and other beverages.

BACKGROUND OF THE INVENTION

Various types of automatic coffee and tea dispensers are known. Generally described, these dispensers hold a measure of ground coffee, tealeaves, or other type of brewable material in a container of some sort. Hot water typically is added to the material so as to brew the beverage. The material is usually held in some sort of disposable container that must be opened or penetrated so as to allow the hot water to pass therethrough.

One drawback with these known brewing devices is that the elements of the device that come into contact with the brewing material usually must be cleaned. Further, the container for the material must be inserted and aligned in the dispenser for each beverage. As a result, the beverage dispenser as a whole may be somewhat slow between beverage cycles because the container must be inserted, aligned, removed and/or the dispenser elements must be cleaned.

There is a desire, therefore, for a device that brews a beverage with a quick cycle time. The device preferably should be relatively inexpensive and easy to use and produce a high quality beverage. Likewise, the device preferably should be adaptable for different types of brewing materials and amounts of brewing materials.

SUMMARY OF THE INVENTION

The present application thus describes a pod for holding an amount of mixable material. The pod may include a circular sidewall and a base. The base may include a number of apertures. A substantially stiff filter paper may be positioned about the base.

The base and the circular sidewall may be substantially rigid. The base and the circular sidewall may have a height to diameter ratio of about 0.435 or less. The number of apertures may be about 54 apertures. A concave lid may be positioned within the circular sidewall.

The substantially stiff filter paper may have a grammage of about forty (40) grams per square meter and a wet burst strength of about 62 kilopascals. The filter paper may resist deformation under water pressure of up to about eleven (11) Bar for up to about eight (8) to about fifteen (15) seconds. The filter paper may include a number of sheets of filter paper. The brewable material may be in direct contact with the circular sidewall.

A method described herein provides for preparing and packing grinds from a raw material. The method may include the steps of roller grinding the raw material into the grinds such that the smallest ten percent (d(0.1)) of the grinds is larger than about forty (40) microns, placing the grinds into a substantially rigid pod, and tamping the grinds down with a lid.

The method further may include the step of densifying the grinds. The densifying step may include densifying the grinds such that solids in the grinds may be no more than about six (6) percent.

The method further may include the step of injecting the pod with water having a temperature of over about 93 degrees Celsius (about 200 degrees Fahrenheit) at a hydraulic pressure of over about ten (10) bar (about 150 pounds per square inch). The roller grinding step may include grinding the grinds such that over eighty percent (80%) percent of the grinds have a particle size distribution of between about 220 and about 250 microns. The roller grinding step also may provide a surface mean diameter that is at least about 100 microns.

The tamping step may include about 13.6 kilograms of force (about thirty (30) pounds of force). The placing step may include about six (6) to about eight (8) grams of grinds. The placing step and the tamping step result in a grind density of about 0.371 grams per milliliter to about 0.426 grams per milliliter. The method further may include the step of brewing the grinds for about six (6) to about fourteen (14) seconds.

The present application further describes a pod for holding an amount of mixable material. The pod may include a substantially rigid sidewall, a substantially rigid base, and a lid. The sidewall may include an inside diameter and a usable height extending from the base to the lid. The usable height and the inside diameter may include a ratio of less than about 0.44. The ratio also may be about 0.3 or less.

The present application further describes a coffee pod. The coffee pod may include a substantially rigid sidewall, a substantially rigid base, a lid, and coffee grinds positioned therein. Over seventy-five percent (75%) percent of the coffee grinds may have a particle size distribution of between about 200 and about 300 microns. Alternatively, over eighty percent (80%) percent of the coffee grinds may have a particle size distribution of between about 220 and about 250 microns. A beverage may be brewed with the coffee pod by passing water at about nine (9) to about eleven (11) bar through the pod for about eight (8) to about fifteen (15) seconds.

These and other features of the present invention will become apparent upon review of the following detailed description of the preferred embodiments when taken in conjunction with the drawings and the appended claims.

DETAILED DESCRIPTION

Commonly owned U.S. Pat. No. 6,786,134, entitled "COFFEE AND TEA DISPENSER" and U.S. patent application Ser. No. 10/604,445, entitled "COFFEE AND TEA POD", now allowed (U.S. 2005-0016383 A1), are incorporated herein by reference.

Figure 1:
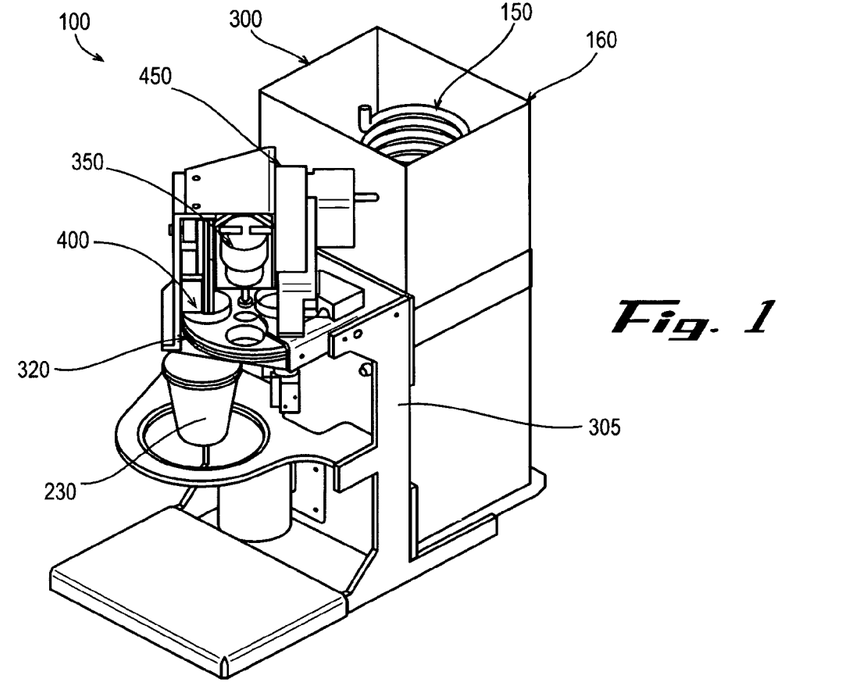
FIG. 1 is a perspective view of one embodiment of a beverage dispenser system for use with the present invention.
Figure 2:
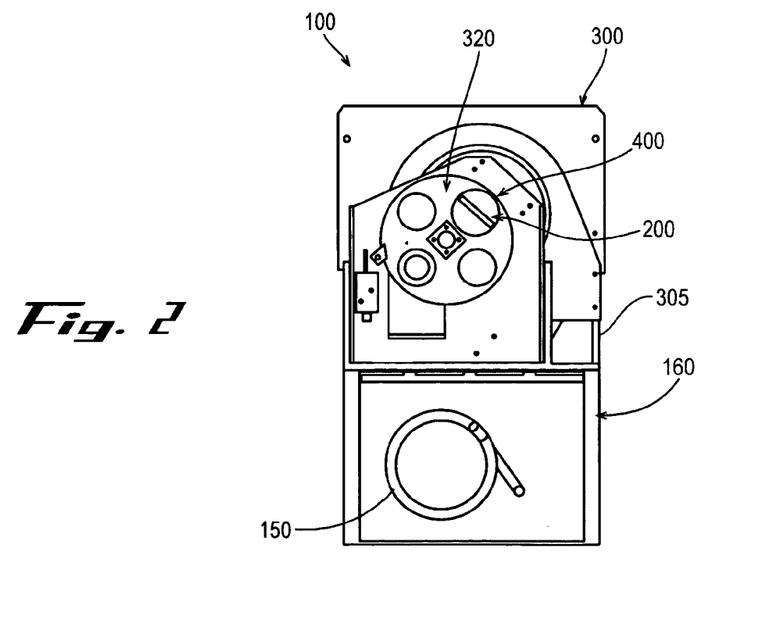
FIG. 2 is a top plan view of the beverage dispenser system of FIG. 1.

Referring now to the drawings, in which like numerals refer to like elements throughout the several views, FIGS. 1 and 2 show one application of a beverage dispenser system 100. In these figures, a pod brewing apparatus 300 is shown. The pod brewing apparatus 300 may include a heat exchanger 150 positioned within a hot water reservoir 160 and in communication with an injection nozzle 200 as is shown. In this embodiment, the elements of the beverage dispenser system 100 as a whole are mounted onto a dispenser frame 305. The dispenser frame 305 may be made out of stainless steel, aluminum, other types of metals, or other types of substantially noncorrosive materials.

Figure 3:
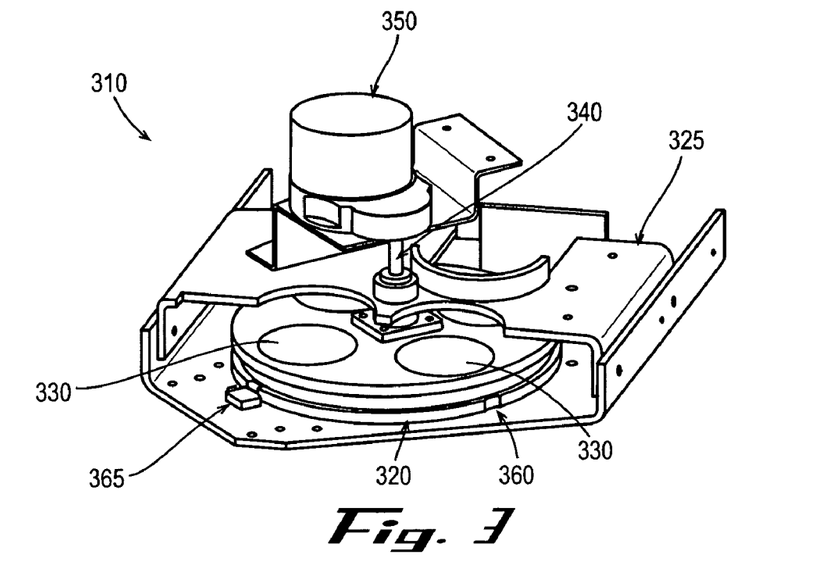
FIG. 3 is a perspective view of a turret system of the beverage dispenser system of FIG. 1.

The injection nozzle 200 may interact with one or more pod cartridges 210 so as to produce the desired beverage in a cup 230 or any other type of receptacle. The pod cartridges 210 may be positioned in the beverage dispenser system 100 within a turret assembly 310. The turret assembly 310 may be fixedly attached to the dispenser frame 305. As is shown in FIG. 3, the turret assembly 310 may include a turret plate 320 positioned within a turret frame 325. The turret frame 325 may be made out of stainless steel, aluminum, other types of conventional metals, or similar types of substantially noncorrosive materials. The turret plate 320 may be substantially circular or have any convenient shape. The turret plate 320 may include a number of pod apertures 330. The pod apertures 330 may be sized to accommodate the pod cartridges 210. The turret plate 320 may spin about a turret pin 340. A turret motor 350 may drive the turret assembly 310. The turret motor 350 may be a conventional AC motor or a similar type of device. The turret motor 350 may drive the turret assembly 310 at about six (6) to about thirty (30) rpm, with about twenty-five (25) rpm preferred.

The turret plate 320 also may have a number of detents 360 positioned about its periphery. The detents 360 may be positioned about each of the turret apertures 330. The detents 360 may cooperate with one or more limit switches 365 so as to control the rotation of the turret plate 320. The rotation of the plate 320 may be stopped when the limit switch 360 encounters one of the detents 360. Rotation of the plate 320 may be controlled by similar types of devices.

Positioned adjacent to the turret assembly 310 may be an injector assembly 400. The injector assembly 310 may be fixedly attached to the dispenser frame 305. The injector assembly 400 also may include an injector frame 410 extending above the turret assembly 310. The injector frame 410 may be made out of stainless steel, other types of metals, or similar types of substantially noncorrosive materials.

Figure 4:
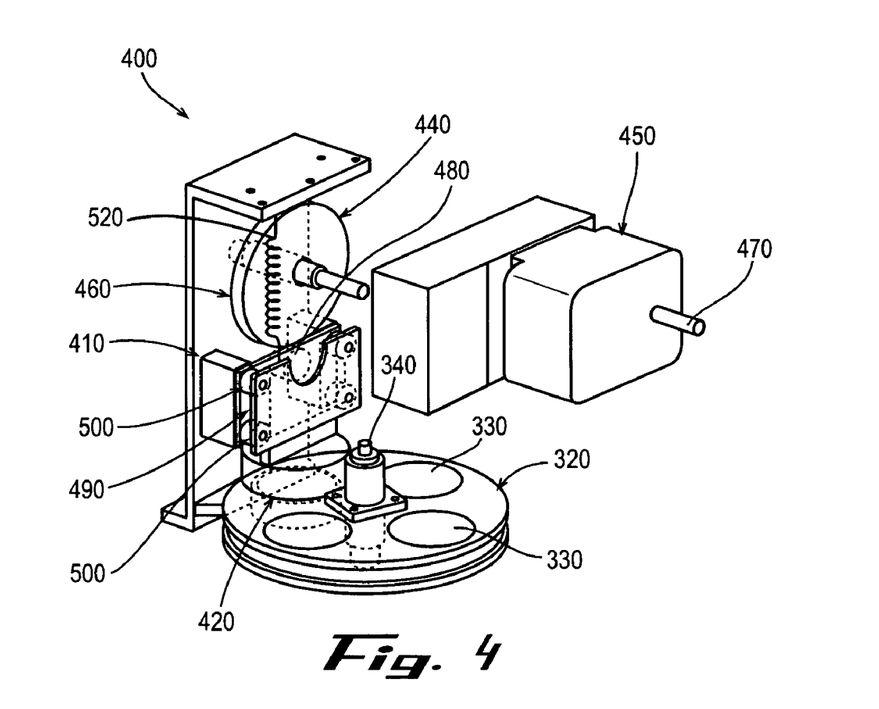
FIG. 4 is a perspective view of an injector assembly of the beverage dispenser system of FIG. 1, with the guide wheels and the return spring of the support plate shown in phantom lines.
Figure 5:
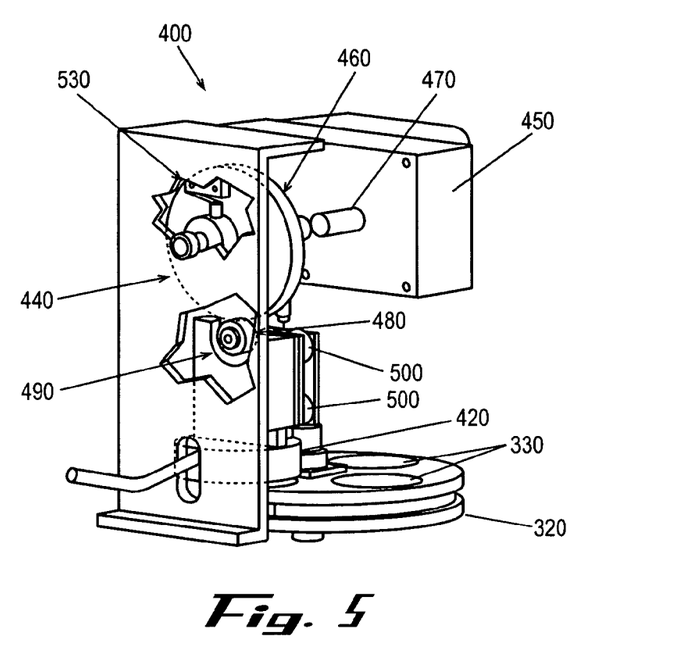
FIG. 5 is a rear perspective view of the injector assembly of the beverage dispenser system of FIG. 1, with the idler wheel and the limit switch shown in a cut away view.

Referring now to FIGS. 4 and 5, the injector assembly 400 may include the injection nozzle 200 as described above with respect to FIG. 2. The injection nozzle 200 may have a narrow tip so as to penetrate the pod cartridge 210 if needed or a wide mouth to accommodate the entire pod cartridge 210. The injector assembly 400 may include an injector head 420 that cooperates with the injection nozzle 200. The injector head 420 may be slightly larger in diameter than the pod cartridges 210. The injector head 420 also may be made out of stainless steel, plastics, or similar types of substantially noncorrosive materials. The injector head 420 may include a sealing ring positioned about its lower periphery. The sealing ring may be made out of rubber, silicone, or other types of elastic materials such that a substantially water tight seal may be formed between the injector head 420 and the pod cartridge 210. The heat exchanger 150 may be in communication with the injector head 420 so as to provide hot, pressurized water to the pod cartridges 210.

The injector head 420 may be moveable in a substantially vertical plane via a cam system 440. (The terms "vertical" and "horizontal" are used as a frame of reference as opposed to absolute positions. The injector head 420 and the other elements described herein may operate in any orientation.) A cam system drive motor 450 may drive the cam system 440. The drive motor 450 may be a conventional AC motor similar to the turret motor 350 described above. The drive motor 450 also may be a shaded pole or a DC type motor. The drive motor 450 may rotate an eccentric cam 460 via a drive belt system 470. The drive motor 450 and the gear system 470 may rotate the eccentric cam 460 at about six (6) to about thirty (30) rpm, with about twenty-five (25) rpm preferred. The eccentric cam 460 may be shaped such that its lower position may have a radius of about 4.1 to about 4.8 centimeters (about 1.6 to 1.9 inches) while its upper position may have a radius of about 3.5 to 4.1 centimeters (about 1.3 to about 1.7 inches).

The eccentric cam 460 may cooperate with an idler wheel 480. The idler wheel 480 may be in communication with and mounted within a support plate 490. The support plate 490 may maneuver about the injector frame 410. The support plate 490 may be made out of stainless steel, other types of steel, plastics, or other materials. The support plate 490 may be fixedly attached to the injector head 420. The support plate 490 may have a number of guide wheels 500 positioned thereon such that the support plate 490 can move in the vertical direction within the injector frame 410. A return spring 520 also may be attached to the support plate and the injector frame 410. A limit switch 530 may be positioned about the cam 460 such that its rotation may not exceed a certain amount.

The injector head 420 thus may maneuver up and down in the vertical direction via the cam system 440. Specifically, the drive motor 450 may rotate the eccentric cam 460 via the gear system 470. As the eccentric cam 460 rotates with an ever-increasing radius, the idler wheel 480 pushes the support plate 490 downward such that the injector head 420 comes in contact with a pod cartridge 210. The eccentric cam 460 may lower the injector head 420 by about 6.4 to about 12.7 millimeters (about one-quarter to about one-half inch). Once the injector head 420 comes into contact with the pod cartridge 210, the eccentric cam 460 may continue to rotate and increases the pressure on the pod cartridge 210 until the cam 460 reaches the limit switch 530. The injector head 420 may engage the pod cartridge 210 with a downward force of about 136 to 160 kilograms (about 300 to 350 pounds). The sealing ring thus may form a substantially airtight and water tight seal about the pod cartridge 210. The drive motor 450 may hold the cam 460 in place for a predetermined amount of time. The cam system 440 then may be reversed such that the injector head 420 returns to its original position.

Once the injection nozzle 200 of the injector head 420 is in contact with the pod cartridge 210, the hot, high-pressure water may flow from the heat exchanger 150 into the injector head 420. The pressure of the water flowing through the pod cartridge 210 may vary with the nature of the brewing material 550 therein.

FIGS. 6-12 show an embodiment of the pod cartridge 210 that may be used with the beverage dispenser system 100 or other types of beverage systems. In fact, the pod cartridge 210 may be used with any type of mixable material, flavoring, additives, and other substances. The pod cartridge 210 may be substantially in the shape of a cup 600. The cup 600 may be made out of a conventional thermoplastic such as polystyrene, polyethylene, polypropylene and similar types of materials. Alternatively, stainless steel or other types of substantially non-corrosive materials also may be used. The cup 600 may be substantially rigid so as to withstand the heat and pressure of the brew cycle without imparting any off-tastes. As described below, however, by the term "rigid" we mean that the cup 600 may flex or deform slightly while under pressure.

The cup 600 may include a substantially circular sidewall 610 and a substantially flat base 620. Other shapes also may be used. The sidewall 610 and the base 620 of the cup 600 may be molded and form a unitary element or a separate sidewall 610 and a separate base 620 may be fixably attached to each other. The sidewall 610 and the base 620, as well as the cup 600 as a whole, may have any convenient diameter so as to accommodate the pod apertures 330 of the turret plate 320 of the turret assembly 310 and the injector head 420 of the injector 400. Alternatively, the sidewall 610 and the base 620 of the cup 600 may have any convenient diameter so as to accommodate other types of beverage dispenser systems 100 or similar types of devices.

Figure 6:
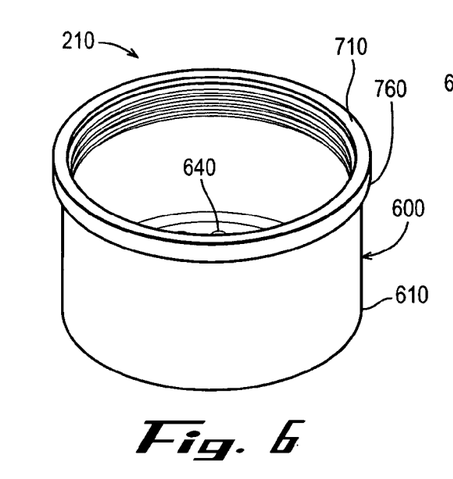
FIG. 6 is perspective view of a pod as described herein.
Figure 7:
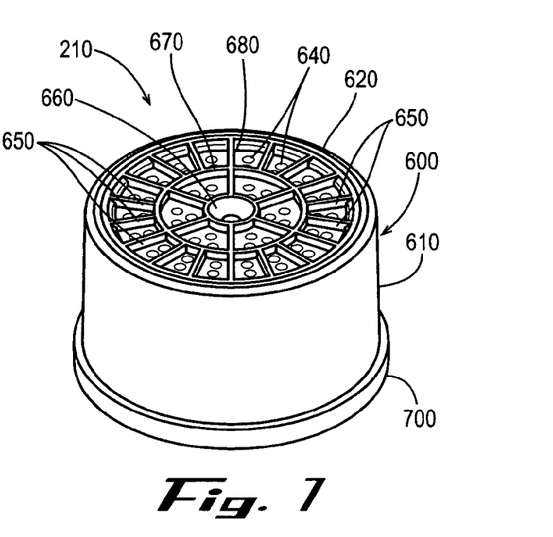
FIG. 7 is perspective view of a pod as described herein.
Figure 8:
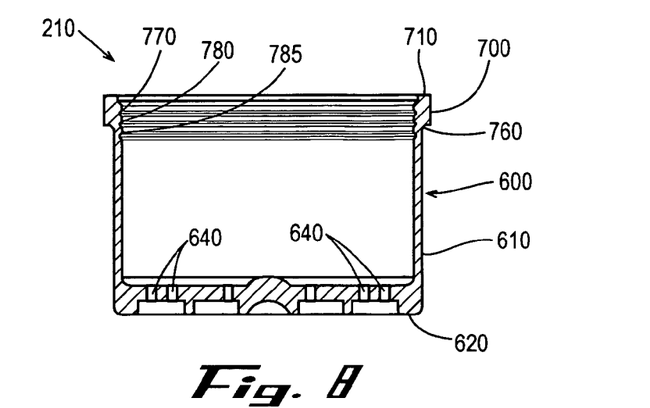
FIG. 8 is a side cross-sectional view of the pod of FIG. 6.
Figure 9:
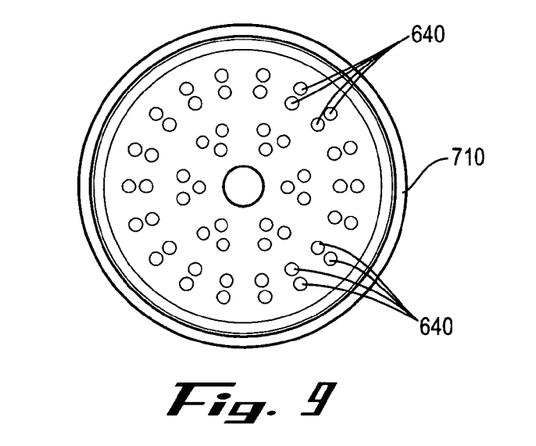
FIG. 9 is a top perspective view of the pod of FIG. 6.

By way of example, the sidewall 610 may have an inside diameter of about 39.3 millimeters (about 1.549 inches) with a wall thickness of about 1.1 millimeters (about 0.043 inches). The sidewall 610 may have a slight taper from the top to the bottom. Other sizes or dimensions may be used as desired.

The cup 600 as a whole may have a variable depth depending upon the amount of brewing material intended to be used therein. In the case of the cup 600 intended to be used for about a 355 milliliter (about twelve (12) ounce) beverage, the cup 600 may have a total height of about 28.7 millimeter (about 1.13 inches) and a useable inside height of about 17.1 millimeters (about 0.674 inches). The height to diameter ratio for the 355 milliliter cup 600 therefore may be about 0.73 for the total height and about 0.435 for the usable inside height. The cup 600 may have about 6.4 grams of a polypropylene material.

A cup 600 to be used with, for example, about a 237 milliliter (about an eight (8) ounce) beverage may have a height of about 22.5 millimeters (about 0.887 inches) and a usable inside height of about 11.8 millimeter (about 0.463 inches). The ratio thus may be about 0.57 for the total height and about 0.3 for the usable inside height. The cup 600 may have about 5.8 grams of a polypropylene material.

These ratios between diameter and depth provide the cup 600 and the cartridge 210 as a whole with sufficient strength and rigidity while using a minimal amount of material. The cartridge 210 as a whole may have about five (5) to about eight (8) grams of plastic material therein when using, for example, a polypropylene homopolymer. As a result, the cup 600 and the cartridge 210 as a whole may withstand temperatures of over about 93 degrees Celsius (about 200 degrees Fahrenheit) for up to sixty (60) seconds or more at a hydraulic pressure of over about ten (10) bar (about 150 pounds per square inch). Although the cup 600 having these ratios may flex or deform somewhat, the cup 600 and the cartridge 210 as a whole should withstand the expected water pressure passing therethough. These dimensions and characteristics are for the purpose of example only. The sidewall 610 and the base 620 of the cup 600 may take any desired or convenient size or shape. For example, the sidewall 610 may be straight, tapered, stepped, or curved if desired.

Figure 10:
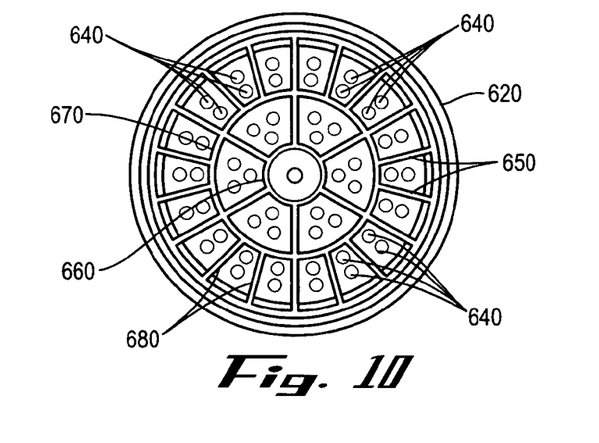
FIG. 10 is a bottom perspective view of the pod of FIG. 6.

The base 620 may include a number of apertures 640 formed therein. The apertures 640 may extend through the width of the base 620. The apertures 640 may be largely circular in shape with a diameter each of about 1.6 millimeters (about 0.063 inches). Any desired shape or size, however, may be used. In this embodiment, about 54 apertures 640 are used herein, although any number may be used. The selected number and size of apertures 640 provide the appropriate pressure drop when a cup 600 of a given dimension is used.

The base 620 also may have a number of support ribs 650 positioned thereon. An inner circular rib 660, an outer circular rib 670, and a number of radial ribs 680 may be used. In this embodiment, the ribs 650 may have a depth of about one (1) millimeter (about 0.04 inches), although any desired thickness may be used. Likewise, any desired number and/or shape of the ribs 650 may be used. The design of the ribs 650 also provides increased support and stability to the cartridge 210 as a whole with a minimum amount of material.

The sidewall 610 of the cup 600 also may include an upper lip 700. The upper lip may include a substantially flat top portion 710. The flat top portion 710 may have a width of about 3.45 millimeters (about 0.136 inches) and a height in the vertical direction of about 3.4 millimeters (about 0.135 inches). The lip 700 may be configured to accommodate the size of the pod apertures 330 and the injector head 420 as well as the expected force of the hot water provided by the injector head 420 while using as little material as possible. This is particularly true given that the cartridge 210 as a whole generally is supported only about its lip 700 during the injection process.

Figure 13:
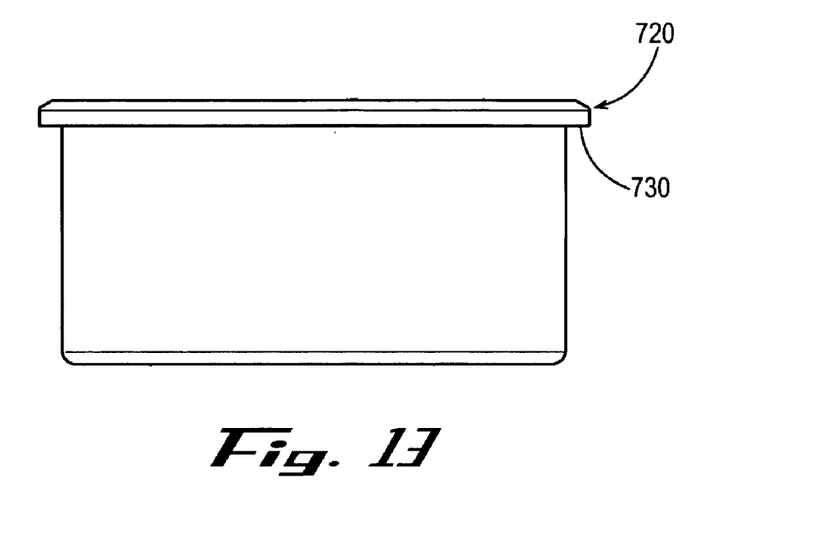
FIG. 13 is a side plan view of an alternative embodiment of the lip of the pod of FIG. 6.
Figure 14:
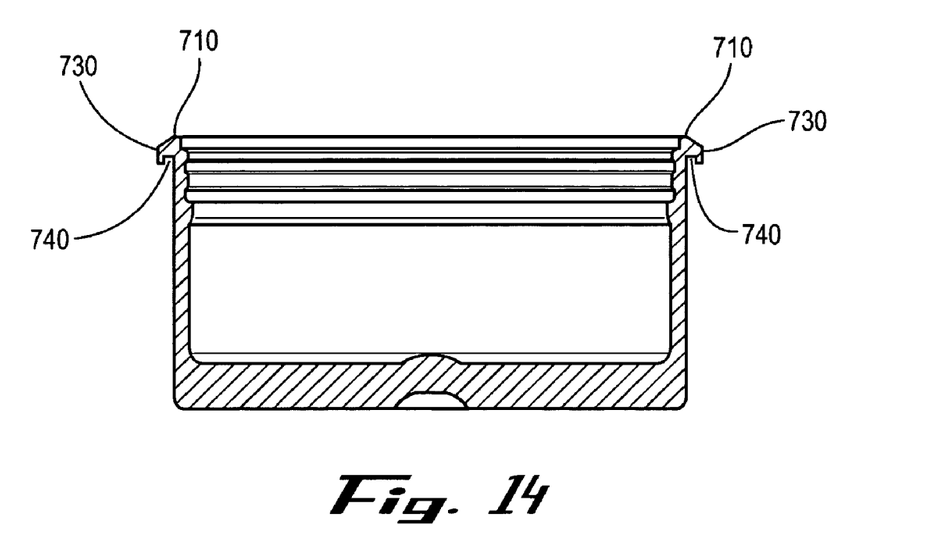
FIG. 14 is a side cross-sectional view of the pod of FIG. 13.

FIGS. 13 and 14 show an alternative embodiment of the lip 700. In this embodiment, a lip 720 may include the substantially flat top portion 710 and a downwardly angled flanged 730 that extends from the top portion 730. The flange 730 may extend downward so as to form a pocket 740 with the sidewall 610. The top of the pocket 740 may have a curved inner radius. The flange 730 and the pocket 740 of the lip 720 are sized to accommodate the size of the pod apertures 330.

Referring again to FIGS. 6-12, the sidewall 610 of the cup 600 also may include a number of cutouts 760 formed therein. In this embodiment, a first cutout 770, a second cutout 780, and a third cutout 785 may be used. Any number of cutouts 760, however, may be used. For example, only two (2) cutouts 760 may be used with a 237 milliliter (about an eight (8) ounce) cup 600. The cutouts 760 may be continuous around the inner circumference of the sidewalls 610 or the cutouts 760 may be intermittent.

Figure 11:
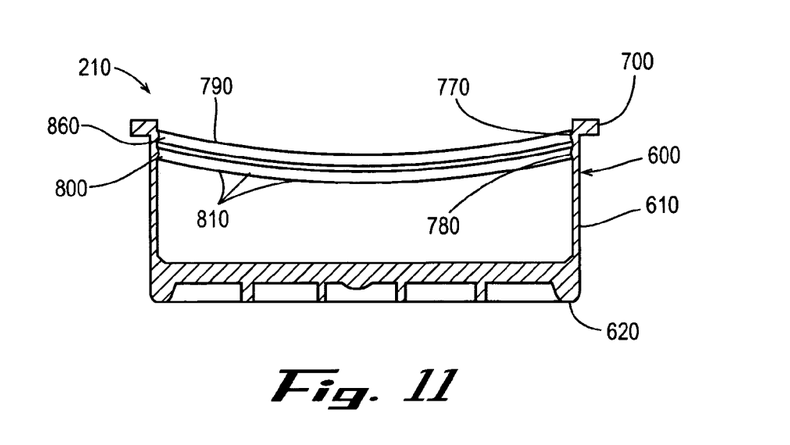
FIG. 11 is a side cross-sectional view of a pod showing the lid.

The cutouts 760 may cooperate with a lid 790. The lid 790 may have an edge 800 that is substantially wedge-shaped about its perimeter for insertion within a cutout 760. The use of the cutouts 760 ensures that the lid 790 remains in place. The edge 800 may be continuous or intermittent so as to mate with the cutouts 760. The lid 790 preferably is bowed inwardly or may be largely concave in shape. The lid 790 may have about 0.8 grams of a polypropylene material.

The lid 790 may be placed in one of the cutouts 760 depending upon the amount of brewing material that is to be placed in the cup. The lid 790 may be bowed downward in a concave shape so as to tap the brewing material 550 down under pressure and to keep the brewing material therein from shifting. The lid 790 may provide the correct tamp force to the brewing material 550 and holds the material under load via essentially a Bellville washer principle. The use of the lid 790 to tamp the brewing material 550 also permits a faster fill rate when loading the cup 600 with the brewing material 550. The lid 790 also may have a number of apertures 810 therein so as to permit water from the injector head 420 to pass therethrough. Depending upon the nature of the injector head 420, the use of the lid 790 may not be necessary.

Figure 12:
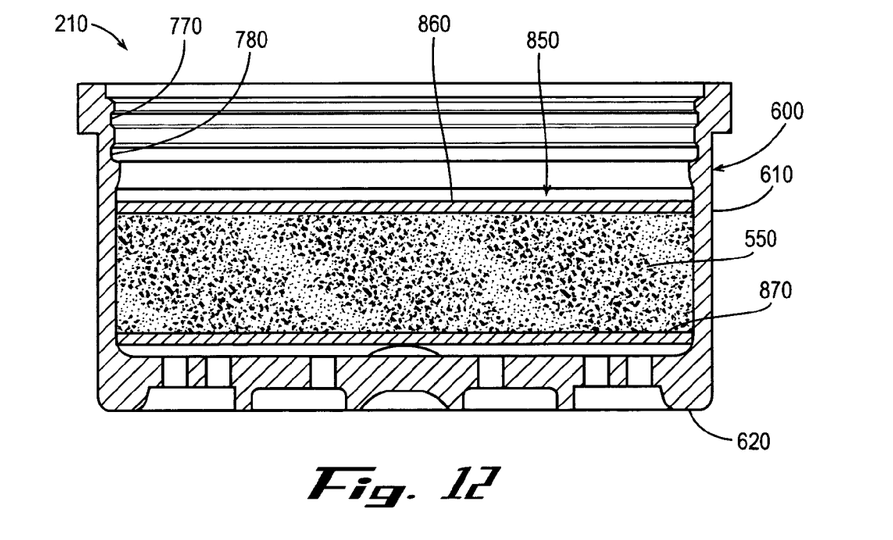
FIG. 12 is a side cross-sectional view of a pod cartridge with an amount of brewing material positioned therein.

The cup 600 may be lined with one or more layers of a filter paper 850. The filter paper 850 may be standard filter paper used to collect the brewing material 550 while allowing the beverage to pass therethrough. The filter paper 850, however, should have sufficient strength, stiffness, and/or porosity such that it does not deflect into the apertures 640 of the base 620 and/or allows fine particles of the brewing material 550 to close or clog the apertures 640. Clogging the apertures 640 may create an imbalance in the pressure drop though the cartridge 210. Because of the stiff paper 850 that substantially resists deformation, the apertures 640 of the base 620 of the cup 600 may have a somewhat larger diameter for increased flow therethrough.

For example, the filter paper 850 may be made with a combination of cellulose and thermoplastic fibers. Examples of suitable filter papers 850 are sold by J. R. Crompton, Ltd. of Gainesville, Ga. under the designations PV-377 and PV 347C. For example, the PV-347C material may have a grammage of about forty (40) grams per square meter and a wet burst strength of about 62 kilopascals. Similar types of materials may be used. Multiple sheets of paper also may be used. The multiple sheets each may have the same or differing characteristics.

The pod cartridge 210 may have an upper filter layer 860 and a lower filter layer 870. The lower filter layer 860 is generally positioned therein without the use of adhesives. The upper filter layer 860 may not need as much strength as the lower layer 870. The upper filter layer 860 generally provides water dispersion and prevents the grinds from clogging the injector head 420. The brewing material 550 itself may be positioned between the upper and lower filter layers 860, 870. Preferably, the brewing material 550 is in direct contact with the sidewall 610, i.e., there is no filter paper 850 position around the inner diameter of the cup 600. This positioning forces the water to travel through the brewing material 550 itself as opposed to traveling through the cup 600 via the filter paper 850.

The brewing material 550 may be placed within a foil envelope or other type of substantially air impermeable barrier. The foil envelope 590 may serve to keep the brewing material 550 therein fresh and out of contact with the ambient air. Alternatively, the entire pod cartridge 210 may be placed within a foil envelope, either individually or as a group, until the cartridge 210 is ready for use.

Figure 15:
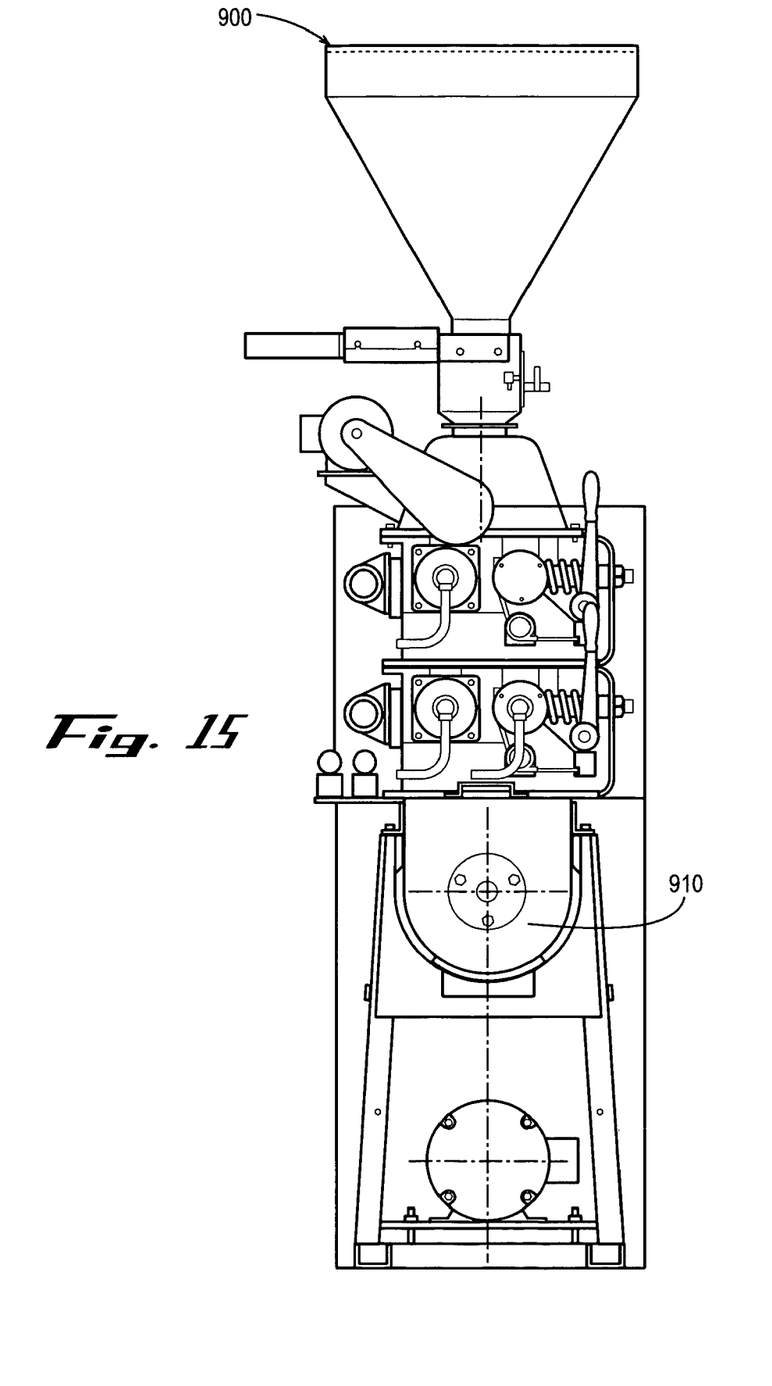
FIG. 15 is a side plan view of a grinder for use with the invention as described herein.

The brewable material 550 itself usually is prepared in a grinder 900. The grinder 900 may take the raw material, coffee beans in this example, and grind them into coffee grinds. As is shown in FIG. 15, the grinder 900 preferably is a roller grinder. An example of such a grinder 900 is manufactured by Modern Process Equipment, Inc. of Chicago, Ill. under the designation of model 660FX. A roller grinder 900 is preferred over other types of grinders such as a burr grinder. The roller grinders seem to provide better particle size distribution, i.e., the particle size distribution is more consistent. The roller grinder 900 provides fewer large particles that may tend to under-extract and provide off tastes and fewer "fines" or very small coffee particles that tend to alter the taste of the final beverage by over-extracting and contributing to bitterness. Limiting fines also has an effect on the back pressure within the pod cartridge 210 as the back pressure is inversely proportional to the square of the particle size. The back pressure thus increases as the particle size decreases.

Figure 16:
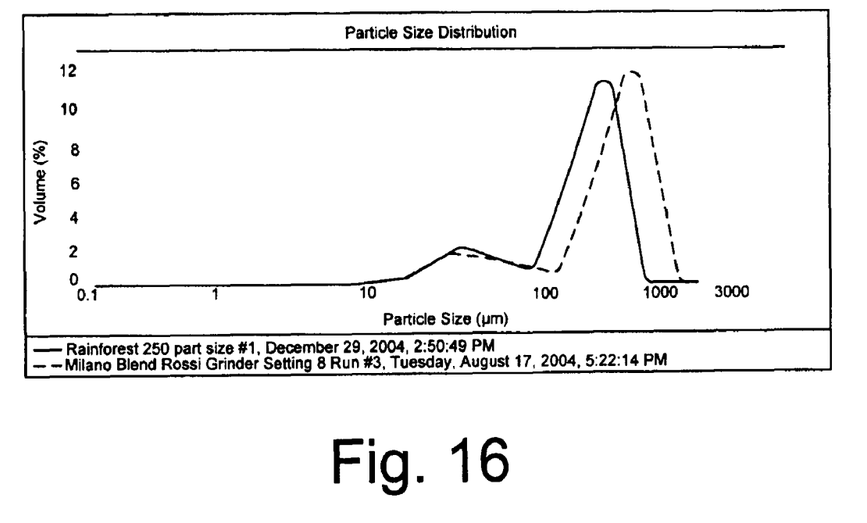
FIG. 16 is a particle size distribution chart.

A comparison between a roller grinder and a burr grinder is shown in FIG. 16. The roller grinder particle distribution (the "Rainforest" grind with the spike to the left) ends at about the 8.0 µm particle size while the burr grinder (the "Milano" grind with the spike to the right) continues to the 0.1 µm particle size. Likewise, there a fewer larger particles with the roller grinder, As is shown, over eighty percent (80%) of the grinds ground with the roller grinder 900 have a particle size distribution between about 220 and about 250 microns (micrometers) with over ninety-nine percent (99%) having a particle size distribution between about eight (8) micron and 650 microns. Broadly, over seventy-five percent (75%) percent of the coffee grinds may have a particle size distribution of between about 200 and about 300 microns. Although a consistent particle size distribution of around 250 microns provides an improved beverage, a certain amount of fine particles also may be desired so as to provide the resistance and desired pressure during brewing. The lack of enough fines may allow the water to pass through too quickly. As such, ten (10) to twenty (20) percent of the distribution may be in about the forty micron range.

Figure 17:
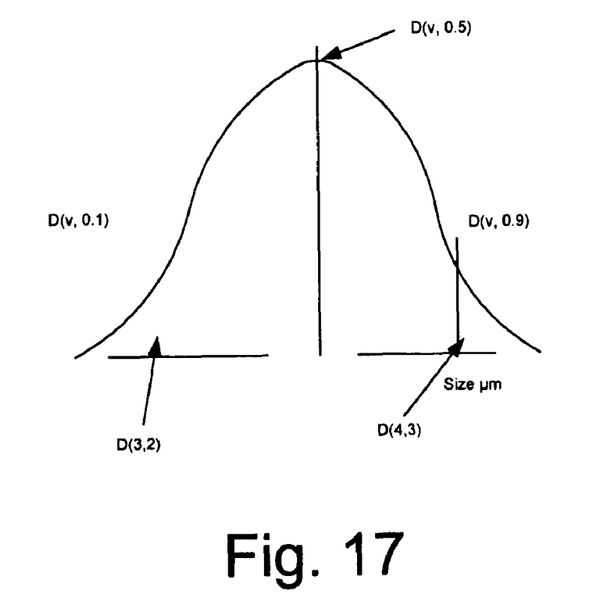
FIG. 17 is a particle size distribution chart.

In order to control the number of fines and to control the back pressure and resistance, an evaluation of the particle size of the smallest ten percent (10%) (d(0.1)) may be used. The smaller this number is, the greater the percentage of the particles that are smaller than a given diameter. The position of d(0.1) is shown in FIG. 17.

Generally speaking and by way of example, d(0.1) of about 43 microns may be acceptable while 25 micron may be unacceptable.

A similar approach is to look at the surface area mean diameter. The surface area mean diameter is useful because as particle size decreases, the surface area to volume ratio quickly increases. The surface area mean diameter is calculated by multiplying each particle diameter by the total surface area of material in all particles of that size, summing, and dividing by the total surface area of all particles. Thus, for a diameter at the coordinates of 3,2 shown above, the calculation is:

$$D[3,2] = \frac{\sum D_i^3 n_i}{\sum D_i^2 n_i}$$

Generally speaking and by way of example, a surface area mean diameter at D[3,2] of 116 microns may be acceptable while a diameter of 78 microns may not be acceptable. Similar calculations may be made that focus on the presence of larger particles. For example, the volume mean diameter D[4,3] also may be calculated:

$$D[4,3] = \frac{\sum D_i^4 n_i}{\sum D_i^3 n_i}$$

The roller grinder 900 thus provides a narrower and more consistent particle size distribution. Similarly, the number of fines can be monitored so as to limit bitterness while maintaining a consistent pressure therethrough. Such a particle size distribution provides a coffee beverage with improved and consistent taste.

The grinder 900 also may include a densifier 910. The densifier 910 may include a number of blades so as to form the individual grinds into a more uniform size and shape. Specifically, the grinds seem to be have a more uniform spherical shape and seem to be somewhat hardened. Densification of the grinds results in changing the brew characteristics in that the increase in density changes the nature of the water flow through the grinds.

In addition to creating substantially uniform spheres, the densifier 920 also seems to reduce the number of fines or small particles by "sticking" the smaller particles to the larger particles. The sticking may be due to the oils in the grinds, the work added to the grinds, or other causes. For example, with densification, solids in the coffee may about six (6) percent. Without densification, however, the solids may reach about 7.5 percent, which provides a finished product that may be too strong. The net result is a smaller, more uniform particle size distribution. Although densification has been used to improve the packing of coffee, densification has not been employed so as to change the brew characteristics of the grinds.

In use, the lower layer 870 of filter paper may be placed with the cup 600 of the pod cartridge 210 along the base 620. An amount of the brewing material 550 then may be positioned therein. The upper layer 860 of the filter paper then may be placed on the brewing material 550 if desired. The lid 790 then may be placed within the cup 600 so as to tamp down the brewing material 550 with about 13.6 kilograms of force (about thirty (30) pounds of force). The amount of force may vary. Once the lid 790 has compacted the brewing material 550, the edge 800 of the lid 790 is positioned within the appropriate cutout 760 within the sidewall 610 of the cup 600. The pod 210 then may be sealed or otherwise shipped for use with the beverage dispenser system 100 or otherwise.

The pod 210 may be positioned within one of the pod apertures 330 in the turret assembly 310. Specifically, the outer edge of the pod aperture 330 aligns with the lip 700 of the cup 600 such that the cup 600 is supported by the lip 700. The injector head 420 then may be positioned about the pod 210. The sealing ring of the injector head 420 may seal about the top portion 710 of the lip 700 of the cup 600. The use of a rounded lip or a lip with a non-flat shape may cause damage to the sealing ring given the amount of pressure involved, i.e., as described above, the injector head 420 may engage the pod cartridge 210 with a downward force of about 136 to about 160 kilograms of force (about 300 to about 350 pounds) and the incoming water flow may be pressurized at about ten (10) to about fourteen (14) bar (about 145 to 200 pounds per square inch (psi)). The pressure of the water flowing through pod cartridge 210 may vary with the nature of the brewing material 550. The hot pressurized water may be provided to the cartridge 210 from any source.

The water passing through the injection head 420 may spread out over the lid 790 and the apertures 810 thereof and into the brewing material 550. The nature of the water flow through the cartridge 210 as a whole depends in part upon the geometry and size of the cartridge 210, the nature, size, and density of the brewing material 550, the water pressure, the water temperature, and the brew time. Altering any of these parameters may alter the nature of the brewed beverage. The brewed beverage may then pass through the apertures 640 in the base 620 of the cup 600.

As is shown in FIG. 12, the pod cartridges 210 may be filled with different types of grinds, leaves, or other types of a brewing material 550. In the case of a single serving espresso beverage of about thirty-five (35) milliliters, about six (6) to about eight (8) grams of specially ground coffee may be placed in the pod cartridge 210. Likewise, the same amount of ground coffee may be used to brew an American style coffee with the addition of about 180 milliliters (about six (6) ounces) of water. About two (2) to about five (5) grams of tealeaves may be added to the pod cartridge 210 in order to brew about a 180 milliliter (about six (6) ounce) cup of tea.

Each different type of coffee or other type of brewing material 550 has a different size grind. For example, one coffee bean may be ground to about 500 to 800 particles for a typical drip filter-type coffee. The same coffee bean may be ground to over 3500 particles for an espresso grind. The particles themselves have different sizes and weights.

Maintaining particle size uniformity, as described above, is preferred. Coffee grind particles that are not the correct size will generally over extract or under extract the soluble solids out of the coffee. The use of the grinder 900 helps to ensure a more consistent particle size. The use of the densifier 910 also assists in providing particle size uniformity. Tamping the coffee grinds down assists in providing uniform fluid flow through the cup 600. As described above, particle size relates to the back pressure that does the "work" of brewing the beverage.

With respect to brew time and temperature, brew temperatures are typically in the range of about 85 to about 100 degrees Celsius (about 185 to about 212 degrees Fahrenheit) or sometimes warmer at about 10 to about 14 bar. The water within the hot water reservoir 160 may be heated to about 102 degrees Celsius (about degrees 215.6 degrees Fahrenheit) by the heat exchanger 150. The water loses some of its heat as it passes thought the injector head 420 and into the cartridge 210.

By way of example, a "Roma" espresso beverage as described above, may use the 237 milliliter (eight (8) ounce) cartridge 210 with about six (6) grams of coffee grinds therein. The cartridge 210 may produce about thirty-five (35) milliliters of the beverage. The water may leave the hot water reservoir 160 at about 102 degrees Celsius (about degrees 215.6 degrees Fahrenheit) and have a brew time of about eight (8) seconds (plus or minus two (2) seconds) at about eleven (11) bar. (Densification of the grinds may speed up the brew time and reduce the amount of extracted materials.) The 355 milliliter (twelve (12) ounce) cartridge 210 also could be used if the lid 790 is placed in a lower cutout 760. A "Dark" beverage has similar properties, but uses about 7.3 grams of the grinds. As a result, the brew time is about fourteen (14) seconds.

A "Rain Forest" beverage also may use the 237 milliliter (eight (8) ounce) cartridge 210 with about six (6) grams of grinds therein. These grinds, however, are coarser than the Roma grinds, such that the flow rate through the cartridge 210 may be faster. Hence the brew time would be about seven (7) seconds (plus or minus two (2) seconds). A certain amount of make up water (about 180 milliliters) also may be added to the beverage after brewing. An "Americano" beverage may use the espresso grinds described above with the various grinds and blends having differing characteristic and tastes.

As is shown, the cartridge 210 also may be used to brew tea. In this example, about 2.8 grams of tealeaves may be used. As opposed to the traditional method of seeping tea over several minutes, this example about a 210 milliliter (about seven (7) ounce) beverage may be brewed in about 6.2 seconds. Iced tea also may be brewed with the addition of an amount of make-up water.

Various examples of the brewing parameters are shown below:

|  | Coffee I | Coffee II | Coffee III | Coffee IV | Tea |
|---|---|---|---|---|---|
| Type | Roma | Dar | Rainforest | Breakfast Blend | Chai |
| Particle size | 255 μm | 250 μm | 250 μm | 255 μm |  |
| Pod size | 8 ounce | 8 ounce | 8 ounce | 8 ounce | 8 ounce |
| Weight | 6 grams | 7.3 grams | 6 grams | 6.75 grams | 2.8 grams |
| Density | 0.378 g/ml | 0.371 g/ml | 0.425 g/ml | 0.425 g/ml | 0.426 g/ml |
| Water temperature | 102° C. | 102° C. | 102° C. | 102° C. | 102° C. |
| Pressure | 11 Bar | 11 Bar | 11 Bar | 11 Bar | 11 Bar |
| Brew time | 8.0 seconds | 14.0 seconds | 7.0 seconds | 8.9 seconds | 6.2 seconds |
| Beverage size | 35 ml for espresso; 210 ml for American; Cappuccino has 4 ounces of foamed milk; lattes have 6 ounces of hot milk | 35 ml for espresso; 210 ml for Americano; Cappuccino has 4 ounces of foamed milk; Lattes have 6 ounces of hot milk | 210 ml for Americano | 210 Ml for Americano | 210 ml |

The combination of the variable described herein thus provides a pod cartridge 210 that produces a beverage with a consistent taste. Specifically, the beverage taste is consistent across the use of any number of cartridges 210.

It should be apparent that the foregoing relates only to the preferred embodiments of the present invention and that numerous changes and modifications may be made herein without departing from the spirit and scope of the invention as defined by the following claims and the equivalents thereof.

What is claimed is:

1. A coffee pod, comprising:
   a substantially rigid sidewall;
   a substantially rigid base;
   a lid; and
   coffee grinds positioned therein;
   wherein over seventy-five percent (75%) percent of said coffee grinds comprise a particle size distribution of between about 200 and about 300 microns.

2. The coffee pod of claim 1, wherein over eighty percent (80%) percent of said coffee grinds comprise a particle size distribution of between about 220 and about 250 microns.

3. A method of brewing a beverage with the coffee pod of claim 1, comprising passing water at about nine (9) to about eleven (11) bar through said pod for about eight (8) to about fifteen (15) seconds.

4. A pod for holding an amount of mixable material, comprising: a substantially rigid sidewall; a substantially rigid base; and a lid; said sidewall comprising an inside diameter and a usable height extending from said base to said lid; said usable height and said inside diameter comprising a ratio of less than about 0.44; wherein the substantially rigid sidewall and the substantially rigid base substantially resist deformation at about at least 10 bar.

* * * * *